US006967758B2

(12) United States Patent
Amm et al.

(10) Patent No.: US 6,967,758 B2
(45) Date of Patent: Nov. 22, 2005

(54) SYSTEM AND METHOD FOR SUB-PIXEL ELECTRONIC ALIGNMENT

(75) Inventors: David T. Amm, Sunnyvale, CA (US); Douglas A. Webb, Los Altos, CA (US)

(73) Assignee: Silicon Light Machines Corporation, Sunnyvale, CA (US)

(*) Notice: Subject to any disclaimer, the term of this patent is extended or adjusted under 35 U.S.C. 154(b) by 105 days.

(21) Appl. No.: 10/769,048

(22) Filed: Jan. 30, 2004

(65) Prior Publication Data

US 2004/0183882 A1     Sep. 23, 2004

Related U.S. Application Data

(60) Provisional application No. 60/444,896, filed on Feb. 4, 2003.

(51) Int. Cl.$^7$ ............................. G02B 26/00; B41J 2/47; B41J 2/435; H01J 29/51
(52) U.S. Cl. ...................... 359/237; 359/291; 359/298; 359/231; 347/237; 347/239; 347/250; 385/4; 315/368.12; 353/31; 382/299
(58) Field of Search ............................ 359/237, 291, 359/290, 298, 224, 231; 347/237, 239, 250; 347/235, 248; 315/368.12, 370; 385/4, 31; 353/31, 37; 382/299, 233; 345/204

(56) References Cited

U.S. PATENT DOCUMENTS

| | | | |
|---|---|---|---|
| 4,992,706 A * | 2/1991 | Troemel et al. ........ | 315/368.12 |
| 5,982,553 A | 11/1999 | Bloom et al. | |
| 6,215,579 B1 | 4/2001 | Bloom et al. | |
| 6,480,634 B1 | 11/2002 | Corrigan | |
| 6,847,390 B2 * | 1/2005 | Maeda ...................... | 347/250 |
| 2003/0201986 A1 * | 10/2003 | Willis et al. ................ | 345/204 |

OTHER PUBLICATIONS

D.M. Bloom, et al, "The Grating Light Valve: revolutionizing display technology", Feb. 1997, 10 sheets, vol. 3013, Projection Display III Symposium, SPIE Proceedings, San Jose, Ca.

D.T. Amm, et al., "Grating Light Valve Technology: Update and Novel Applications", May 19, 1998, 4 sheets, Presented at the Society for Information Display Symposium, Anaheim, CA.

D.T. Amm, et al., "Optical Performance of the Grating Light Valve Tehcnology", 1999, pp. 1-8, Presented at Photonics West-Electronics Imaging.

R.W. Corrigan, et al., "Calibration of a Scanned Linear Grating Light Valve Projection System", May 18, 1999, 4 sheets, Presented at the Society for Information Symposium, San Jose, CA.

R.W. Corrigan, et al., "An Alternative Architecture for High Performance Display", Nov. 20, 1999, 5 sheets, Presented at the 141$^{st}$ SMPTE Technical Conference and Exhibition, New York, NY.

Robert Corrigan, et al. "Silicon Light Machines—Grating Light Valve Technology Brief", Jun. 2001 ver.C, pp. 1-8.

* cited by examiner

Primary Examiner—Loha Ben
(74) Attorney, Agent, or Firm—Okamoto & Benedicto LLP (57) ABSTRACT

In one embodiment, a delay circuit is configured to delay pixel information from an image source, such as a frame buffer. The delay circuit may be configured to delay the pixel information by an amount of time that would move a pixel projected on a surface by a distance less than a dimension of the pixel. A light modulator may modulate a light beam onto a surface, such as a display screen, based on the delayed pixel information. This advantageously allows for sub-pixel electronic alignment.

20 Claims, 11 Drawing Sheets

SYSTEM AND METHOD FOR SUB-PIXEL ELECTRONIC ALIGNMENT

REFERENCE TO RELATED APPLICATION

This application claims the benefit of U.S. Provisional Application No. 60/444,896, filed on Feb. 4, 2003 by David T. Amm and Douglas A. Webb, which is incorporated herein by reference in its entirety.

BACKGROUND OF THE INVENTION

1. Field of the Invention

The present invention relates generally to imaging systems, and more particularly, but not exclusively, to imaging systems using micro electromechanical system (MEMS) devices.

2. Description of the Background Art

Arrays of light-modulating elements have been applied to imaging systems, such as display and printing systems. The light-modulating elements may comprise, for example, Grating Light Valve™ (GLV™) light-modulating elements available from Silicon Light Machines of Sunnyvale, Calif. For example, a two-dimensional image may be projected onto a screen using one or more linear arrays of light-modulating elements. In such display systems, a linear modulator array modulates an incident light beam to display pixels along a column (or, alternatively, a row) of a two-dimensional (2-D) image. A scanning system is used to move the column across a projection screen such that each light-modulating element is able to generate a row of the 2-D image. In this way, the entire 2-D image is displayed.

Publications describing light modulator devices and their applications include, among others: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; "Breakthrough MEMS Component Technology for Optical Networks," Robert Corrigan, Randy Cook, and Olivier Favotte, Silicon Light Machines—Grating Light Valve Technology Brief, 2001; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

In printing applications, image data can be scanned across print media to create exposure and 2-D images, or the print media can be moved across a fixed, modulating one-dimensional (1-D) line of light. For example, a laser beam may be bounced off a reflective surface of a light modulating element and onto a plate, which may be on a rotating drum. The laser beam has a power density sufficient to expose the plate. The light modulating elements are actuated to modulate the laser beam and form a pattern on the plate. The plate is inked and rolled onto paper to transfer the pattern thereon. Examples of other printing applications involving light modulators include integrated circuit (e.g., lithography), liquid crystal display (LCD), and printed circuit board (PCB) fabrication.

One problem with using a scanned-linear array in display systems, such as those using a 1-D light modulator array, is that it is difficult to achieve perfect alignment of all three primary colors namely, red, green, and blue (RGB). Each color is modulated from a separate light modulator array and is optically combined to overlap in exactly the same location on a screen. In the vertical (array) direction, the pixel locations are defined by the location of the arrays themselves. The alignment in this direction needs to be precise and is controlled almost entirely by the mechanical alignment of the arrays. In the horizontal (scanning) direction, the pixel location may be determined by several factors, including mechanical alignment of the arrays, the location of the optical illumination, and the timing of the supporting electronics. Pixel alignment is also an issue in printing applications because some printing applications involve multiple colors and/or arrays, or may require multiple passes for exposure averaging, bit depth, or improved resolution. Some printing applications may also involve "stitching" the outputs of multiple arrays end-to-end to form a longer 1-D swath, for example.

Figure 1:
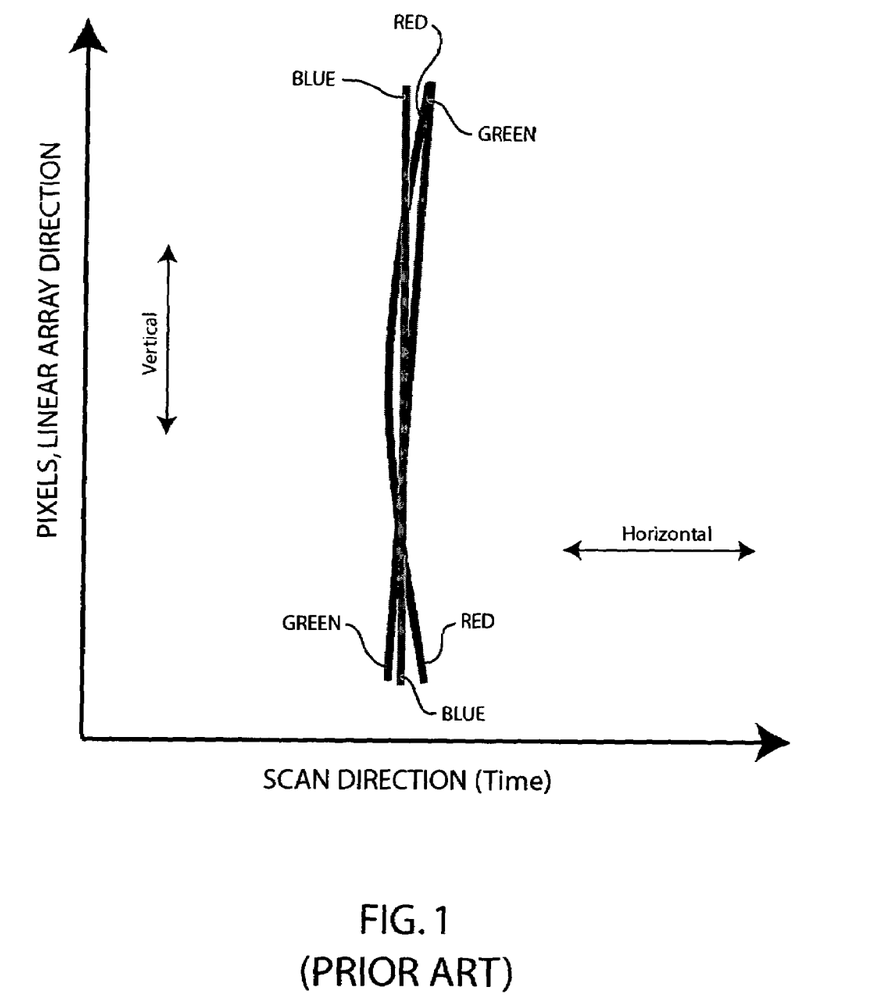
FIG. 1 shows a "bow" or convergence problem resulting from misalignment of red, green, and blue colors in display applications.

FIG. 1 shows a "bow" or convergence problem resulting from misalignment of red, green, and blue colors in display applications. In the example of FIG. 1, three linear 1-D light modulator arrays (one array per color) are oriented vertically, and the horizontal axis represents the scanning direction. In most cases, the convergence problem shown in FIG. 1 cannot be fully corrected by purely mechanical alignment. Because some imaging system color convergence specifications are in the range of ±0.1 pixel to ±0.5 pixel, a more robust solution to this misalignment problem is needed.

SUMMARY

In one embodiment, a delay circuit is configured to delay pixel information from an image source, such as a frame buffer. The delay circuit may be configured to delay the pixel information by an amount of time that would move a pixel projected on a surface by a distance less than a dimension of the pixel. A light modulator may modulate a light beam onto the surface, such as a display screen, based on the delayed pixel information. This advantageously allows for sub-pixel electronic alignment.

These and other features of the present invention will be readily apparent to persons of ordinary skill in the art upon reading the entirety of this disclosure, which includes the accompanying drawings and claims.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
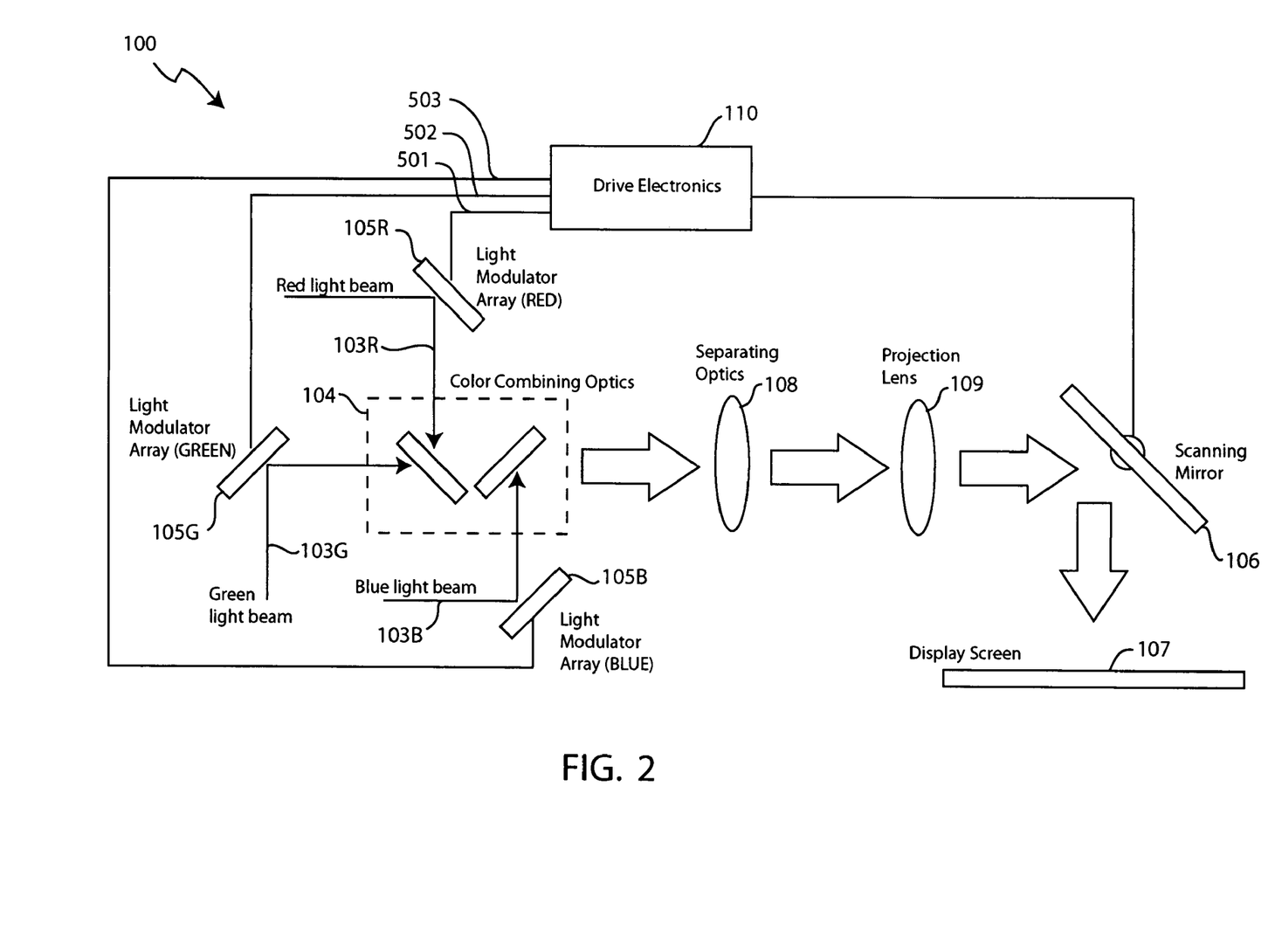
FIG. 2 shows a schematic diagram of a display system in accordance with an embodiment of the present invention.

Turning now to FIG. 2, there is shown a schematic diagram of a display system 100 in accordance with an embodiment of the present invention. Display system 100 may be of the same type as that disclosed in commonly-assigned U.S. Pat. No. 6,480,634, except for the use of a drive electronics 110 having features in accordance with embodiments of the present invention. U.S. Pat. No. 6,480,634 is hereby incorporated by reference in its entirety. Note that the display system of U.S. Pat. No. 6,480,634 is used herein merely to provide an example; embodiments of the present invention may be employed with other imaging systems without detracting from the merits of the present invention.

System 100 comprises light modulator arrays 105 (i.e., 105R, 105G, 105B), color combining optics 104, separating optics 108, a projection lens 109, a scanning mirror 106, and a display screen 107. Not shown are light sources that shine light beams 103 (i.e., 103R, 103G, 103B) on light modulator arrays 105. Each light source may be a laser source, for example. A red light beam 103R is impinged on a light modulator array 105R, a green light beam 103G is impinged on a light modulator array 105G, and a blue light beam 103B is impinged on a light modulator array 105B. Each light beam 103 is modulated by its corresponding light modulator array 105 onto color combining optics 104, which may be a dichroic filter group. Combining optics 104 direct light beams 103 toward separating optics 108, which may include a Schlieren filter. Separating optics 108 separates each light beam 103 into its constituent Fourier components, passing selected light beam components while stopping others. In one embodiment, separating optics 108 stops light beam components that are reflected off a light modulator, but passes light beam components that are plus one and minus one diffraction orders. From separating optics 108, light beams 103 are projected onto display screen 107 byway of projection lens 109 and scanning mirror 106. Scanning mirror 106 scans light beams 103 across screen 107 to project an image thereon. Drive electronics 110 synchronizes and controls the operation of light modulator arrays 105, the light beam sources (not shown), and scanning mirror 106. Light modulator arrays 105R, 105G, and 105B are coupled to drive electronics 110 by way of electrical connections 501, 502, and 503, respectively. Electrical connections 501, 502, and 503 are also later discussed in connection with FIG. 5.

Figure 3A:
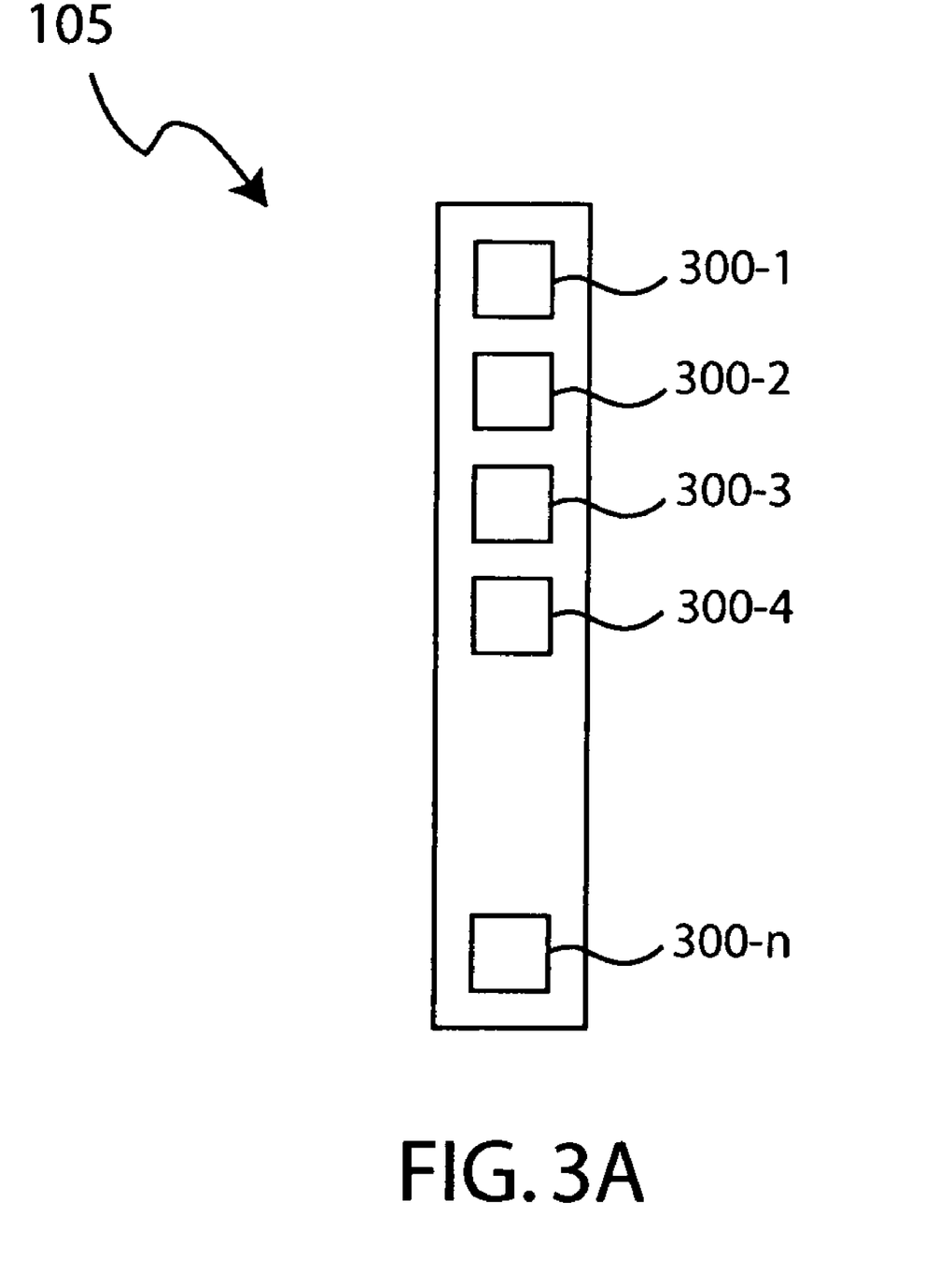
FIG. 3A schematically shows a light modulator array.
Figure 3B:
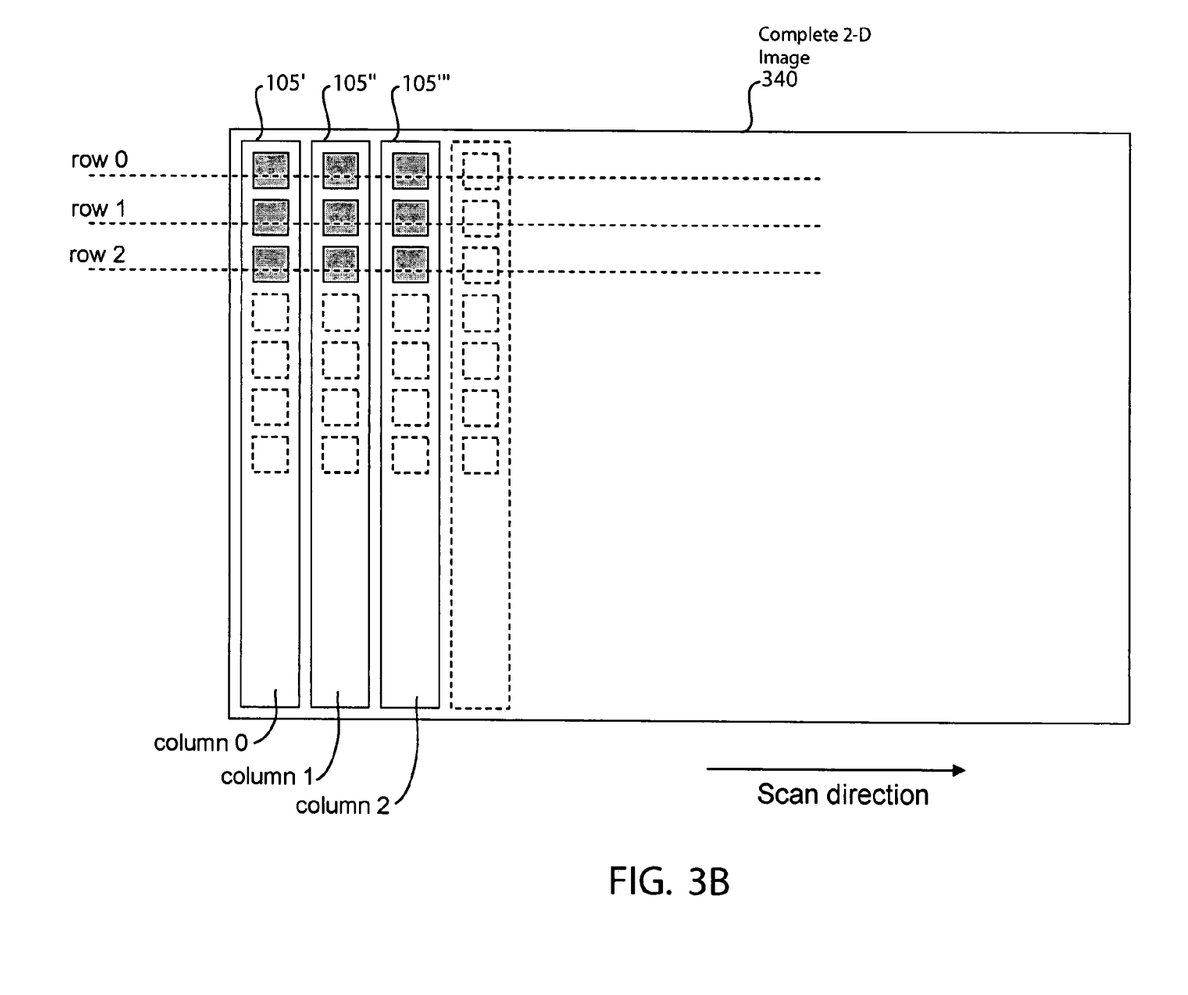
FIG. 3B pictorially illustrates the scanning of a light modulator array to form a two-dimensional image.

FIG. 3A schematically shows a light modulator array 105. Light modulator array 105 may comprise one or more light modulators 300 (i.e., 300-1, 300-2, . . . , 300-$n$). In one embodiment, light modulator array 105 comprises 1080 light modulators 300. Thus, light beams 103 impinging on light modulator array 105 may be projected onto screen 107 to display a video image having a vertical resolution of 1080 pixels. Scanning mirror 106 may scan the projected line to different locations on screen 107 to paint a complete two-dimensional (2-D) image. FIG. 3B pictorially illustrates how a light modulator array 105 may be scanned across a screen to form a complete 2-D image 340. In FIG. 3B, the label 105' denotes a column of pixels from the light modulator array 105 at a first time period, the label 105" denotes a column of pixels from the same light modulator array 105 at a second time period, the label 105''' denotes a column of pixels from the same light modulator array 105 at a third time period, and so on. Three separate light modulator arrays 105 may be employed to form a multi-color image. Referring to FIG. 2, projecting light beams 103R (red), 103G (green), and 103B (blue) modulated by light modulator arrays 105R, 105G, and 105B, respectively, on the same spot on screen 107 allows for displaying of a multi-color pixel.

Figure 4A:
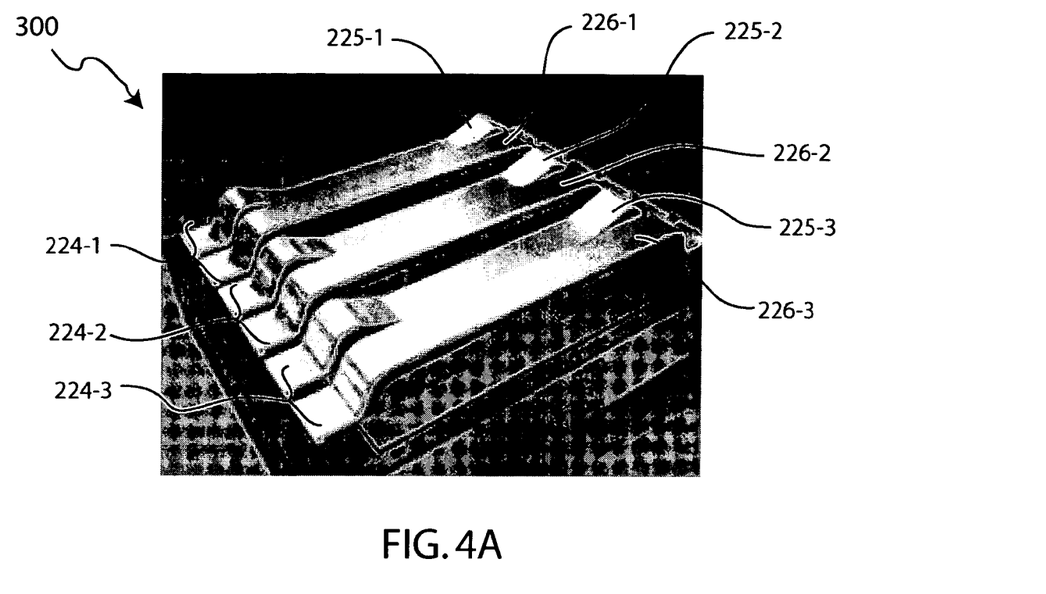
FIG. 4A shows a perspective view of a ribbon light modulator.

Referring to FIG. 4A, there is shown a perspective view of a light modulator 300. Light modulator 300, which is also referred to as a "ribbon light modulator," may be of the same type as the GLV™ light modulator from Silicon Light Machines, Inc. The modulator 300 comprises an array of ribbon pairs 224 (224-1, 224-2, 224-3). Each ribbon pair 224 comprises a fixed ribbon 226 (226-1, 226-2, 226-3) and a deflectable ribbon 225 (225-1, 225-2, 225-3). In the example of FIG. 4A, ribbon pair 224-1 comprises fixed ribbon 226-1 and deflectable ribbon 225-1, ribbon pair 224-2 comprises fixed ribbon 226-2 and deflectable ribbon 225-2, and so on. In accordance with an embodiment of the present invention, a ribbon may be a silicon nitride micro-structure coated with a reflective surface of aluminum alloy. Ribbon pairs 224 may be fabricated using MEMS technology.

Ribbon pairs 224 are suspended above an air gap. Underneath ribbon pairs 224 is a common bottom electrode, which may be set at ground potential. Applying a bias voltage on ribbons 225 results in an electrostatic force that attracts deflectables ribbon 225 towards the bottom electrode, thus deflecting the deflectable ribbon 225. A fixed ribbon 226 stays relatively taut and un-deformed during this time. Removing the bias voltage causes the deflectable ribbon 225 to spring back to its original un-deformed shape. The amount by which a ribbon 225 is deflected towards the bottom electrode depends on the applied bias voltage.

Figure 4B:
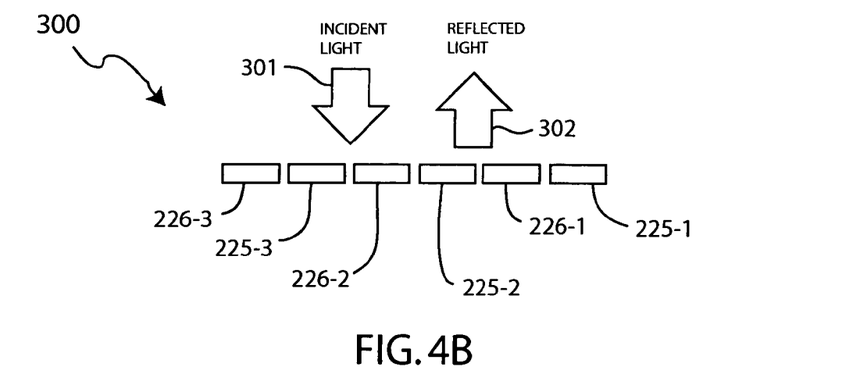
FIG. 4B schematically shows a ribbon light modulator in a specular state.

FIG. 4B schematically shows light modulator 300 in a specular state, which is a state where no bias voltage is applied on ribbons 225. In the specular state, deflectable ribbons 225 and fixed ribbons 226 are un-deflected, thereby causing an incident light 301 to reflect off the surface of the ribbons as a reflected light 302.

Figure 4C:
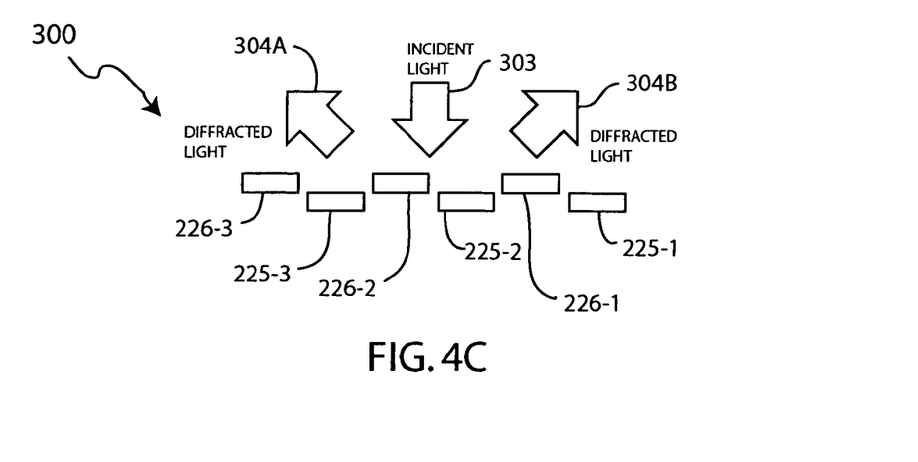
FIG. 4C schematically shows a ribbon light modulator in a diffraction state.

FIG. 4C schematically shows light modulator 300 in a diffraction state, which is a state where a bias voltage is applied to ribbons pairs 225. In the diffraction state, deflectable ribbons 225 are deflected while fixed ribbons 226 remain relatively un-deflected. As shown in FIG. 4C, this causes portions of an incident light 303 to diffract off the surface of the ribbons as diffracted light 304 (i.e., 304A, 304B). Thus, by controlling the bias voltage to ribbons 225, the amount of light being diffracted or reflected may be controlled.

Figure 5:
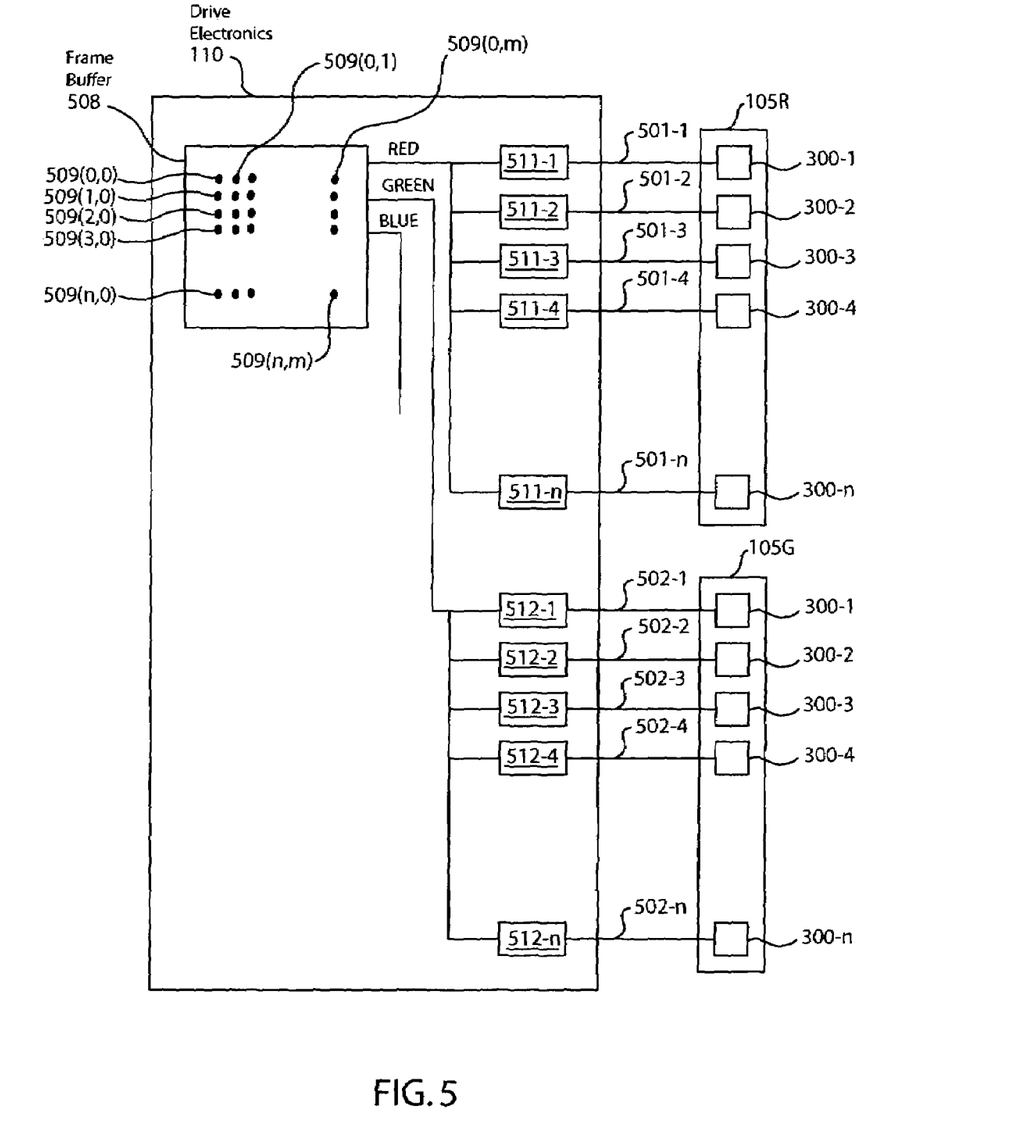
FIG. 5 shows a schematic diagram of a drive electronics in accordance with an embodiment of the present invention.

FIG. 5 shows a schematic diagram of a drive electronics 110 in accordance with an embodiment of the present invention. Drive electronics 110 includes a frame buffer 508 and a delay circuit for each color. In the example of FIG. 5, delay circuits 511 (i.e., 511-1, 511-2, . . . , 511-n) are for red pixel data, while delay circuits 512 (i.e., 512-1, 512-2, . . . , 512-n) are for green pixel data. Delay circuits for blue pixel data are not shown for clarity of illustration.

Frame buffer 508 may comprise computer memory containing pixel information for each pixel of an image to be displayed on display screen 107. In the example of FIG. 5, each pixel of the image is labeled as pixel 509(n,m), where "n" represents row position and "m" represents column position. Each pixel 509 has corresponding pixel data that are used to control the modulation of a corresponding light modulator 300 of a light modulator array 105. In one embodiment, each pixel 509 has pixel data for each primary color (i.e., RGB) of the pixel. An image in frame buffer 508 may be displayed one column at a time using a one dimensional light modulator array 105 arranged from top to bottom as shown in FIG. 5. For example, pixel data for pixels 509(0,0), 509(1,0), . . . , 509(n,0) may be provided to the light modulator arrays 105 to project the first column of the image onto screen 107; pixel data for pixels 509(0,1), 509(1,1), . . . , 509(n,1) may be provided to the light modulator arrays 105 to project the second column a short time later, when the scanning mirror 106 has advanced the projected line by one column width across the screen 107. As the projected line continues to be scanned across the screen, the next column of image data is presented to modulators 105, and so on. Each pixel 509 has a corresponding light modulator 300 in a light modulator array 105. For example, red pixel data for pixel 509(0,0) are provided to light modulator 300-1 of light modulator array 105R, green pixel data for pixel 509(0,0) are provided to light modulator 300-1 of light modulator array 105G, and so on.

In drive electronics 110, delay circuits (e.g., 511, 512) are employed to delay the presentation of pixel data to light modulators 300. For example, delay circuit 511-1 may delay the presentation of a row 0 red pixel data to light modulator 300-1 of light modulator array 105R, delay circuit 511-2 may delay the presentation of row 1 red pixel data to light modulator 300-2 of light modulator array 105R, and so on. Each path from a delay circuit to a light modulator is also referred to as a "channel." For example, delay circuit 511-1 provides pixel data to a light modulator 300-1 on a channel including electrical connection 501-1, delay circuit 511-2 provides pixel data to a light modulator 300-2 on a channel including electrical connection 501-2, and so on.

In operation, pixel data for a group of pixels are serially loaded from frame buffer 508 to corresponding delay circuits—red pixel data are serially loaded to delay circuits 511, green pixel data are serially loaded to delay circuits 512, and so on. After pixel data for a column of pixels are loaded into the delay circuits, a global start signal (not shown) is generated by drive electronics 110 to initiate presentation of pixel data from all the delay circuits to light modulators 300. The delay circuits may be employed to add a delay in presenting pixel data to a light modulator 300 after the global start signal is generated. As will be more apparent below, the delay circuits of drive electronics 110 advantageously allow for sub-pixel electronic alignment along the scan axis direction. That is, by delaying the presentation of pixel data to a light modulator, a pixel may be moved on a display screen (or other writing surface) by a distance that is less than a dimension of the pixel.

A technique for correcting sub-pixel alignment errors in accordance with an embodiment of the present invention is now pictorially described with reference to FIGS. 6–9.

Figure 6:
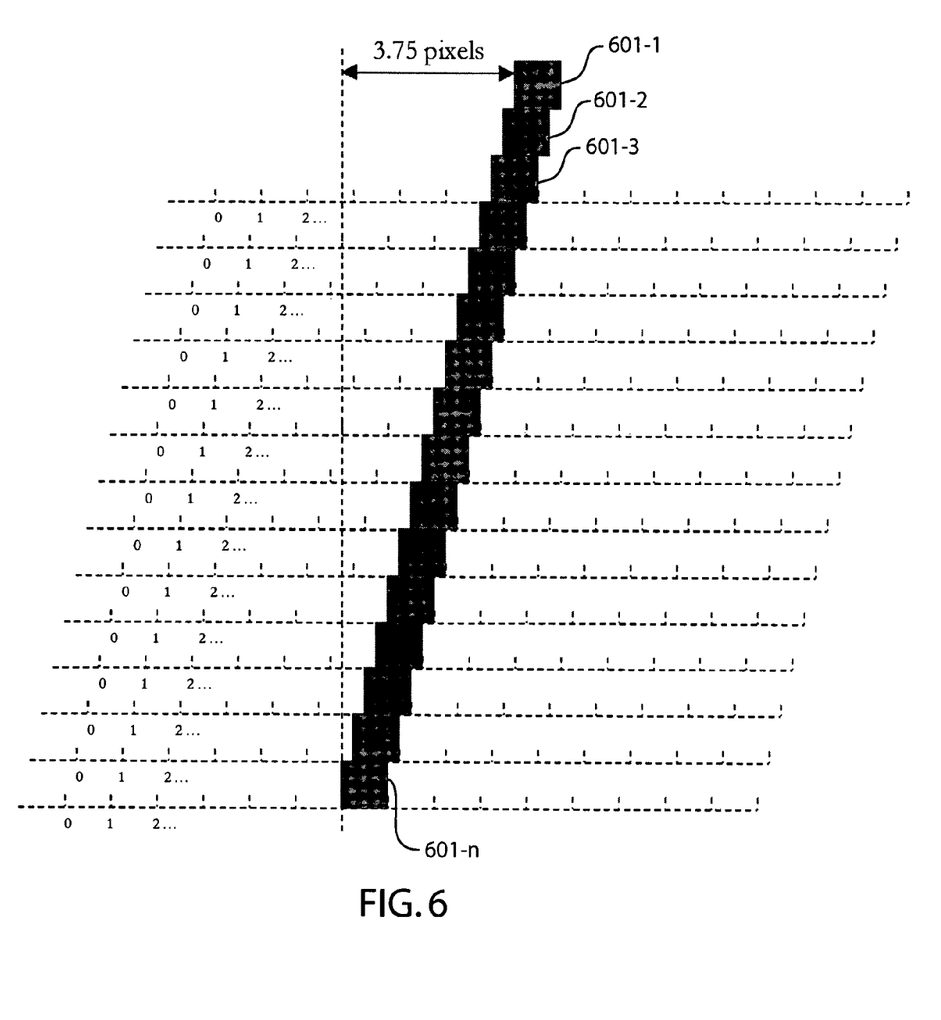
FIG. 6 schematically shows an image of a line displayed on a display screen (or other writing surface).

Ideally, the rows and columns of the projected image data form a square grid on the screen 107. However, in practice, the projected image data deviates from the ideal square grid. FIG. 6 schematically shows an image of a line displayed on a display screen (or other writing surface). The line is intended to be a vertical line and comprises pixels 601 (i.e., 601-1, 601-2, . . . , 601-n). In the example of FIG. 6, each horizontal "tick" represents the timing and creation of a pixel 601 in the scanning direction. Pixels 601 are displayed on the display screen at the same time but form a tilted line because of a pixel alignment error, which in the example of FIG. 6 is as much as 3.75 pixels. This pixel alignment error is especially noticeable when the line is to be displayed with other lines at the same time, as is the case when overlaying lines to form a multi-color line. Typically, it is desirable to have the line perfectly vertical so there is "convergence" with a line of another color that is already lined up vertically (but not shown here) on the same position on the screen. The tilt of the line could be due to mechanical reasons, such as a tilted linear modulator array, or possibly from a rotation of the optical line illumination, or other causes.

Figure 7:
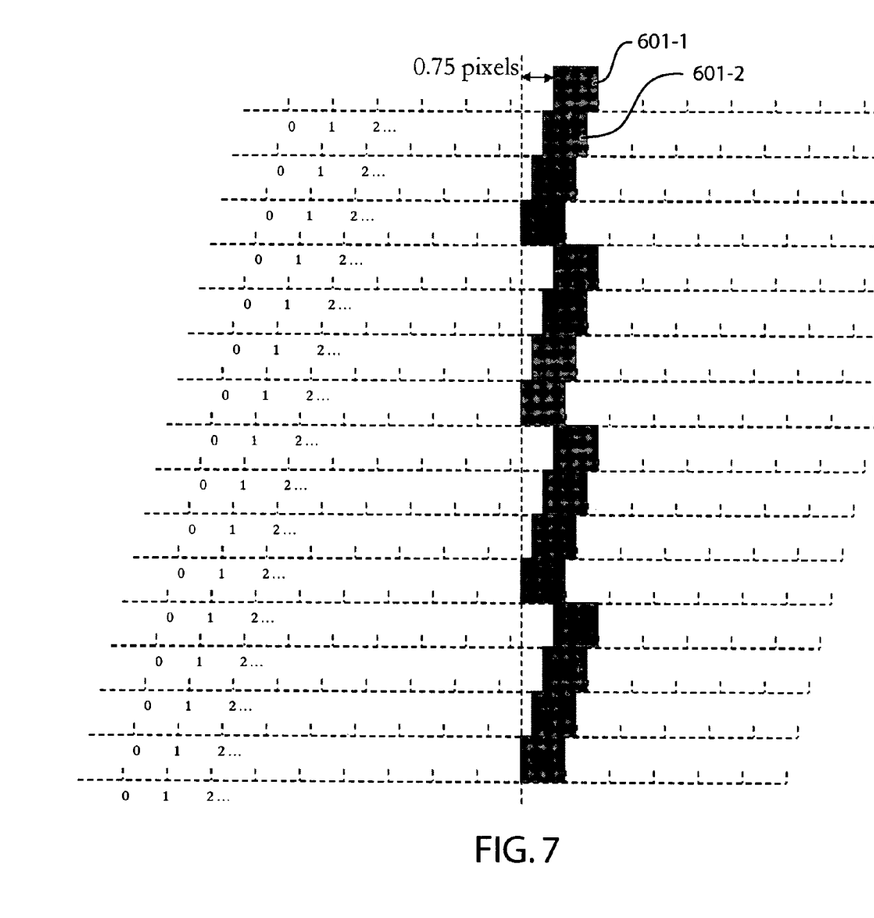
FIG. 7 shows the pixels in the example of FIG. 6 moved in increments of one pixel.
Figure 8:
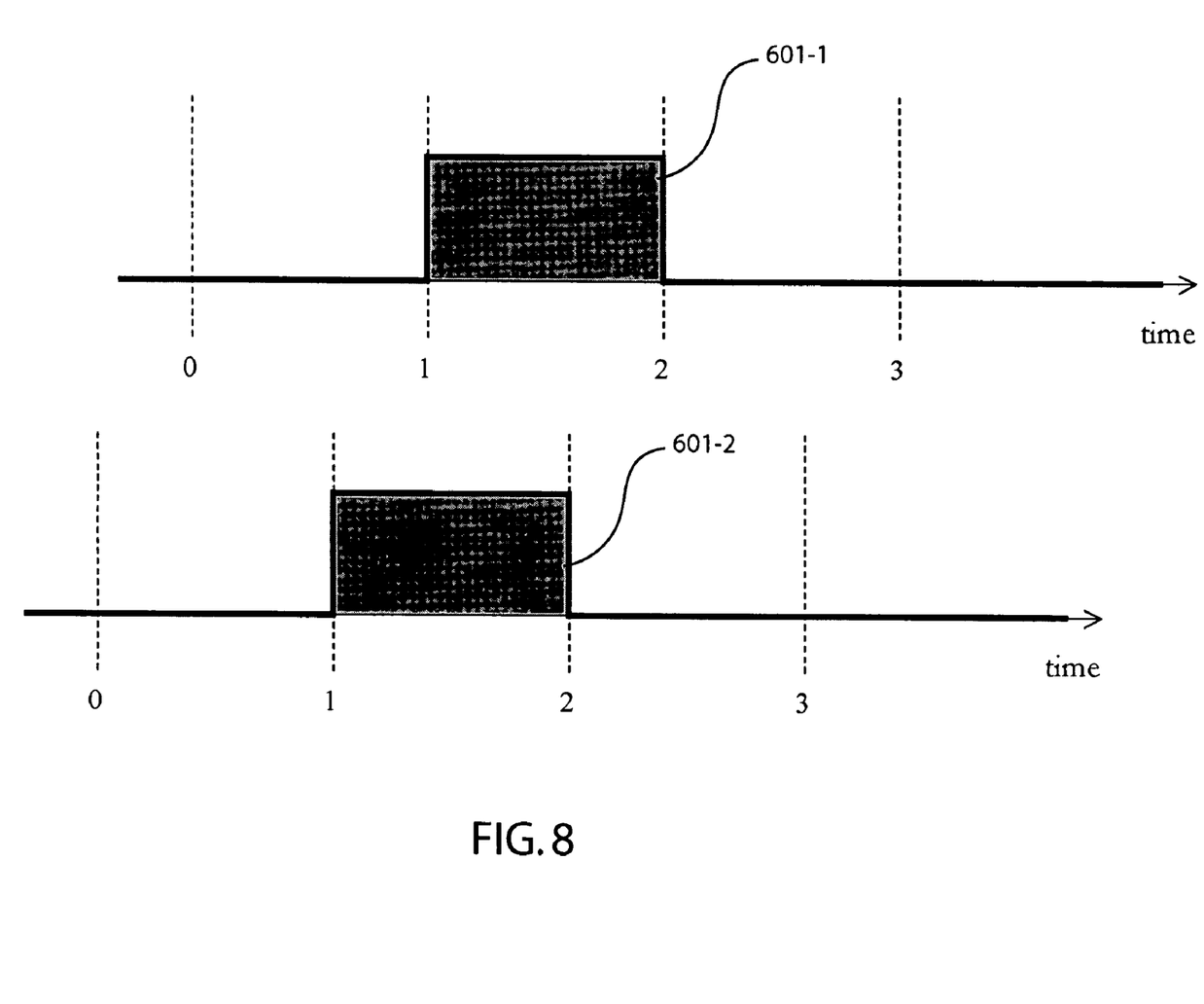
FIG. 8 shows a magnified view of FIG. 7 showing the timing relationship between pixels.

The position of pixels in frame buffer 508 may be manipulated to move their position on the display screen in increments of one pixel. For example, a pixel having data on pixel 509(0,0) may be written to pixel 509(0,1) to move it by a distance of one pixel on the display screen. In other words, a pixel may be moved to another column in frame buffer 508 to adjust that pixel's position on the display screen. However, doing so would only move the pixel in increments equal to a pixel dimension. If a pixel alignment error includes a fraction of a pixel (e.g., 3.75), some fractional pixel alignment error would remain. FIG. 7 shows the pixels in the example of FIG. 6 moved in increments of one pixel by manipulating pixel positions in frame buffer 508. In the example of FIG. 7, the position of pixel 601-1 on the display screen has been moved by three pixels, thereby reducing the pixel alignment error of that pixel from 3.75 pixels (see FIG. 6) to 0.75 pixel. FIG. 8 shows a magnified view of FIG. 7 showing the timing relationship between pixels 601-1 and 601-2. In the example of FIG. 8, pixels 601-1 and 601-2 are projected on the display screen at the same time (time t=1) but do not correctly line up on the screen because of remaining alignment error that is less than a dimension of a pixel.

Figure 9:
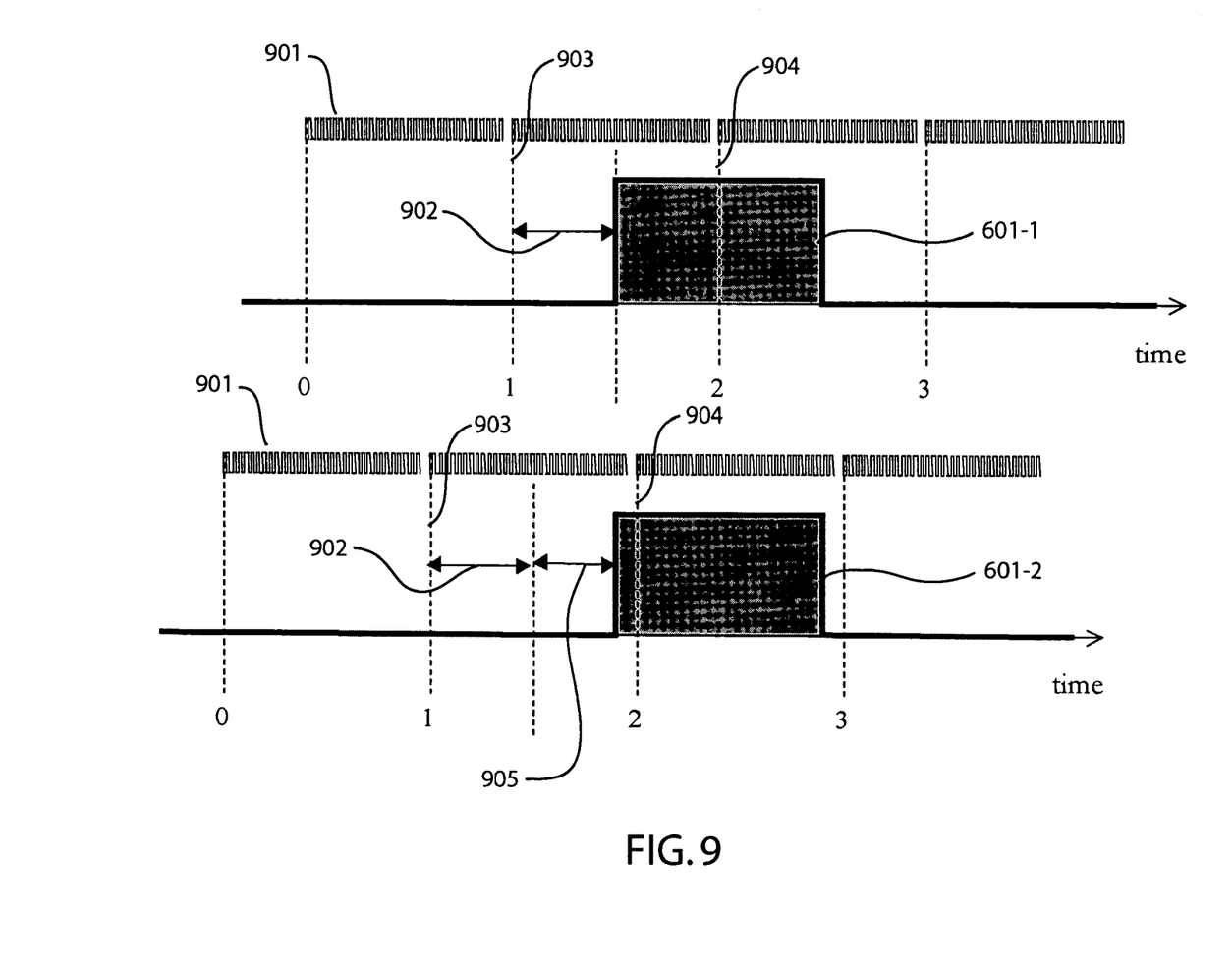
FIG. 9 illustrates how pixels may be calibrated with different delays to bring them into alignment in accordance with an embodiment of the present invention.

FIG. 9 illustrates how pixels may be calibrated with different delays to bring them into alignment. In the example of FIG. 9, a clock source (not shown) provides a pulse train 901. A counter circuit can count the clock pulses 901 to match a preset delay value and thus delay a projected pixel by a distance less than a pixel dimension. In one embodiment where the counter is an 8-bit counter, a global start signal is generated by drive electronics 110 every 256 pulses (i.e., count of 0 to 255) of pulse train 901. For example, a global start signal is generated by drive electronics 110 at time t=1 (see dashed line 903), at time t−2 (see dashed line 904), and so on. The number of pulses of pulse train 901 from time t=1 to time t=2 is 256 in the example where the counter is an 8-bit counter. Pulse train 901 effectively divides a pixel into several time increments. The points in time when a global start signal is generated by drive electronics 110 may be employed as a reference for delaying the pixels. In the example of FIG. 9, pixel 601-1 is not displayed on the screen when a global start signal is generated at time t=1. Instead, pixel 601-1 is displayed after a time delay 902, which corresponds to a sub-pixel movement on the screen. A delay circuit (e.g., 511, 512) in drive electronics 110 may delay the presentation of pixel data of pixel 601-1 to a corresponding light modulator 300 to effect time delay 902. Similarly, in the example of FIG. 9, pixel 601-2 is displayed on the screen after a time delay 902 and a time delay 905. Each pixel may be separately delayed to bring them into alignment.

Figure 10:
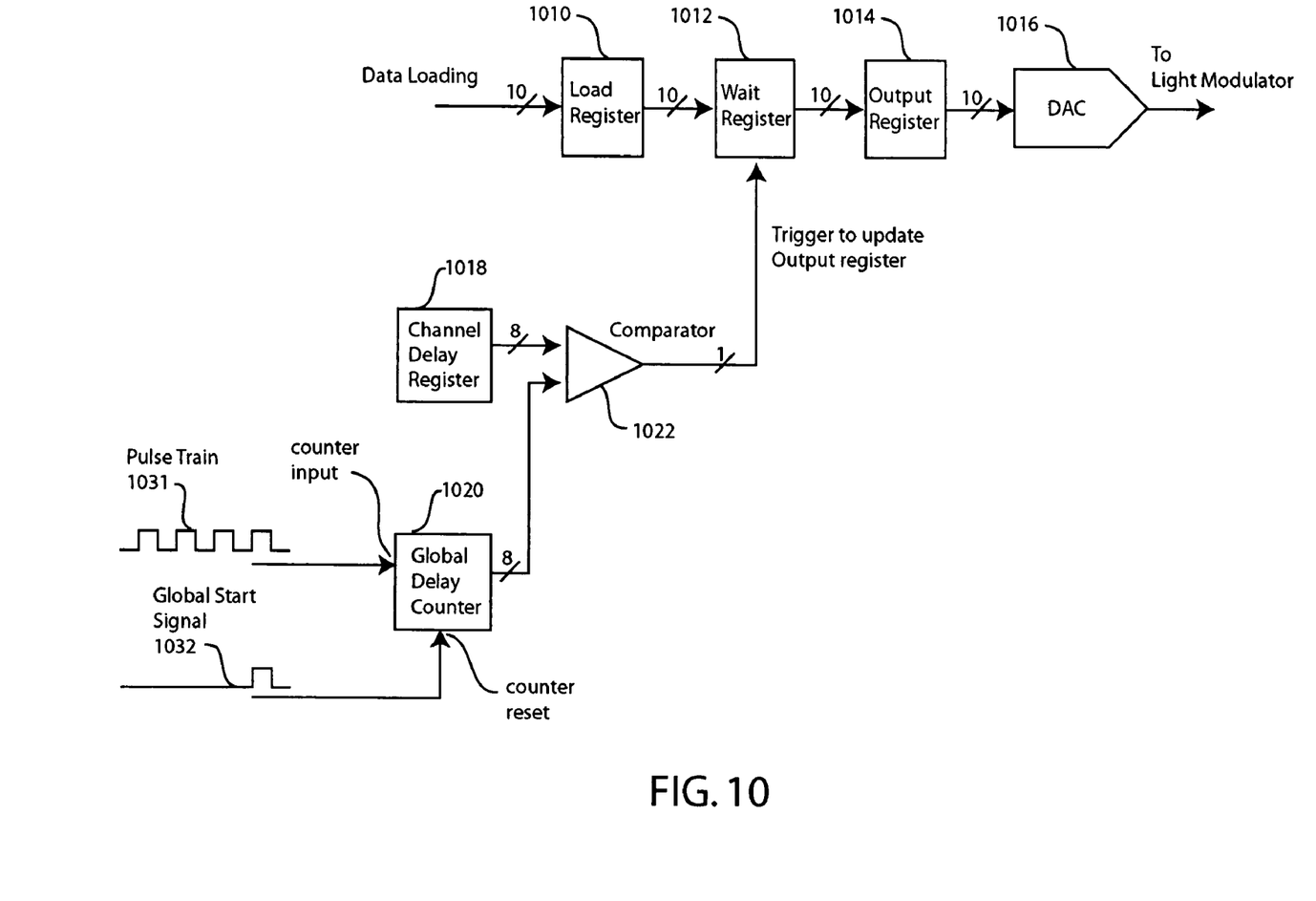
FIG. 10 shows a schematic diagram of a delay circuit in accordance with an embodiment of the present invention.

FIG. 10 shows a schematic diagram of a delay circuit in accordance with an embodiment of the present invention. The delay circuit of FIG. 10 may be employed as a delay circuit 511 or 512 (see FIG. 5), for example. The delay circuit of FIG. 10 is especially useful for driving a scanned linear array of light modulators, but may also be generally employed in other imaging applications. The delay circuit includes a load register 1010, a wait register 1012, an output register 1014, a digital to analog converter (DAC) 1016, a channel delay register 1018, and a comparator 1022. A global delay counter 1020 is "global" in the sense that there is one delay counter 1020 feeding all delay circuits in this embodiment.

In practice, for a given column of image data, the image data from the frame buffer 508 is loaded into delay circuits 511 and 512 in a serial manner. This necessitates a storage or load register in each of the delay circuits 511-1, 511-2, 511-3 etc. In the example of FIG. 10, a load register 1010 receives pixel data from a frame buffer 508. Serial loading of image data to delay circuits 511 and 512 advantageously minimizes wiring in drive electronics 110. In one embodiment, load register 1010 receives 10-bit pixel data for a color of a pixel stored in frame buffer 508. When the entirety of the delay circuitries (all of 511, 512, . . . ) have each received pixel data into load registers 1010, the pixel data are provided to a wait register 1012 over a parallel electrical connection (e.g., 10-bit connection). Wait register 1012 does not output the pixel data to an output register 1014 until it receives a trigger signal from a triggering circuit comprising comparator 1022, delay counter 1020, and channel delay register 1018. Delay counter 1020 generates a count signal that is fed to one input of comparator 1022. In one embodiment, delay counter 1020 is an 8-bit counter that counts from 0 to 255. Delay counter 1020 counts up for every pulse of pulse train 1031. A global start signal 1032 is periodically generated (e.g., every 256 counts of pulse train 1031) by drive electronics 110 to reset delay counter 1020. Therefore, a count of zero indicates that a global start signal has been generated. That is, when the data in the channel delay register 1018 is zero, pixel data for pixels that are aligned may be provided to their respective light modulators 300 for modulation onto a display screen. Of course, any other count value may also be chosen depending on the application.

Channel delay register 1018 stores a delay value that is compared by comparator 1022 to the count of delay counter 1020. When the count of delay counter 1020 is equal to the value stored in channel delay register 1018, comparator 1022 presents a trigger signal to wait register 1012. The trigger signal initiates loading of the pixel data from wait register 1012 to an output register 1014. Output register 1014 latches the pixel data for presentation to a digital to analog converter (DAC) 1016, which immediately provides an analog version of the pixel data to a corresponding light modulator 300 (not shown). The light modulator 300 modulates a light beam based on the analog version of the pixel data, thereby displaying (or not displaying) the pixel on the display screen.

As can be appreciated from the foregoing, channel delay register 1018 may be loaded with a delay value that would move a pixel on the screen by a distance less than a dimension of the pixel. For example, channel delay register 1018 may be loaded with a value of 150 to delay the presentation of a pixel data by 150 counts or pulses of pulse train 1031 after global start signal 1032 in the example where a global start signal is generated every 256 counts. By having delay counter increment in units of time that would correspond to moving a projected pixel by less than a pixel dimension, sub-pixel alignment correction may be achieved. Advantageously, the delay circuit of FIG. 10 provides a purely electronic means of performing sub-pixel alignment correction.

The example shown in FIG. 10 includes a local channel delay register 1018 and a local comparator 1022 for each of the delay circuits 511-1, 511-2, etc. The counter 1020 is global, and there is only one counter for all of the delay circuits. Of course, other embodiments are also possible. For example, a local, loadable counter may be used to replace the channel delay register and the comparator. In that embodiment, the local counter may be loaded with the channel delay value at the global start signal 1032, and a pulse train 1031 may be fed to each local counter. This permits the counting and triggering of the wait register at the desired time.

Embodiments of the present invention have been described using sub-pixel alignment of pixels generated from linear scanning arrays. Other applications include color convergence in light modulator based laser imaging systems using scanned linear arrays, improved stitching of printing or display images when multiple light modulators are used, or where multiple passes of the same modulator array are used, correction of optical issues such as illumination "bow" or "s-shape", laser pointing, and updating during calibration to account for system drift (either mechanical or optical).

While specific embodiments of the invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A system for correcting pixel alignment errors in an imaging system:
    a delay circuit configured to receive a pixel information from an image source, the delay circuit being configured to delay the pixel information by an amount of time that would move a pixel projected on a surface by a distance less than a pixel dimension; and
    a light modulator configured to modulate a light beam onto the surface based on a delayed version of the pixel information from the delay circuit.

2. The system of claim 1 wherein the delay circuit comprises:
    a wait register configured to receive the pixel information from the image source; and
    a triggering circuit configured to trigger the wait register to output the pixel information, the triggering circuit being operable to generate a triggering signal in increments of time that would move a projected pixel by a distance less than a pixel dimension.

3. The system of claim 1 wherein the light modulator comprises a ribbon light modulator.

4. The system of claim 1 wherein the surface comprises a display screen.

5. The system of claim 1 wherein the imaging system comprises a printing system.

6. The system of claim 1 wherein the image source comprises a frame buffer.

7. The system of claim 1 wherein the light modulator is part of a one-dimensional array of light modulators.

8. A method for correcting pixel misalignment in an imaging system, the method comprising:
  receiving pixel data for a pixel to be projected by a light modulator onto a surface;
  delaying the pixel data to generate a delayed pixel data, the pixel data being delayed by an amount of time that would move the pixel on the surface by a distance having a unit that is less than a pixel dimension; and
  using the light modulator to modulate a light beam onto the surface based on the delayed pixel data.

9. The method of claim 8 wherein the surface comprises a display screen.

10. The method of claim 8 wherein the imaging system comprises a printing system.

11. The method of claim 8 wherein delaying the pixel data comprises:
  manipulating a position of the pixel in a frame buffer; and
  holding the pixel data in a wait register until a trigger to provide the pixel data to the light modulator is received by the wait register.

12. The method of claim 8 wherein the light modulator comprises a ribbon light modulator.

13. The method of claim 8 wherein the light modulator is part of a one-dimensional array of light modulators.

14. A system for correcting pixel alignment errors in an imaging system:
  a frame buffer comprising pixel information for an image;
  a wait register configured to receive pixel information from the frame buffer;
  a triggering circuit configured to trigger outputting of the pixel information from the wait register, the triggering circuit being configured to provide a trigger in time increments that would move a pixel on a surface by a distance less than a width of the pixel; and
  a light modulator configured to modulate a light beam onto the screen based on the pixel information.

15. The system of claim 14 wherein the light modulator comprises a ribbon light modulator.

16. The system of claim 14 further comprising a digital to analog converter (DAC) configured to receive the pixel information from the wait register and to present a corresponding analog signal to the light modulator.

17. The system of claim 14 wherein the surface comprises a display screen.

18. The system of claim 14 wherein the imaging system comprises a printing system.

19. The system of claim 14 wherein the triggering circuit comprises:
  a comparator circuit configured to generate a trigger when a delay value is equal to a global counter value, the delay value being configured for the light modulator.

20. The system of claim 14 wherein the light modulator is part of an array of one-dimensional light modulators.

* * * * *